Oct. 20, 1942.                J. S. HELLEN                2,299,578
                        ROTARY PIN-CUTTING TOOL
                         Filed April 8, 1941
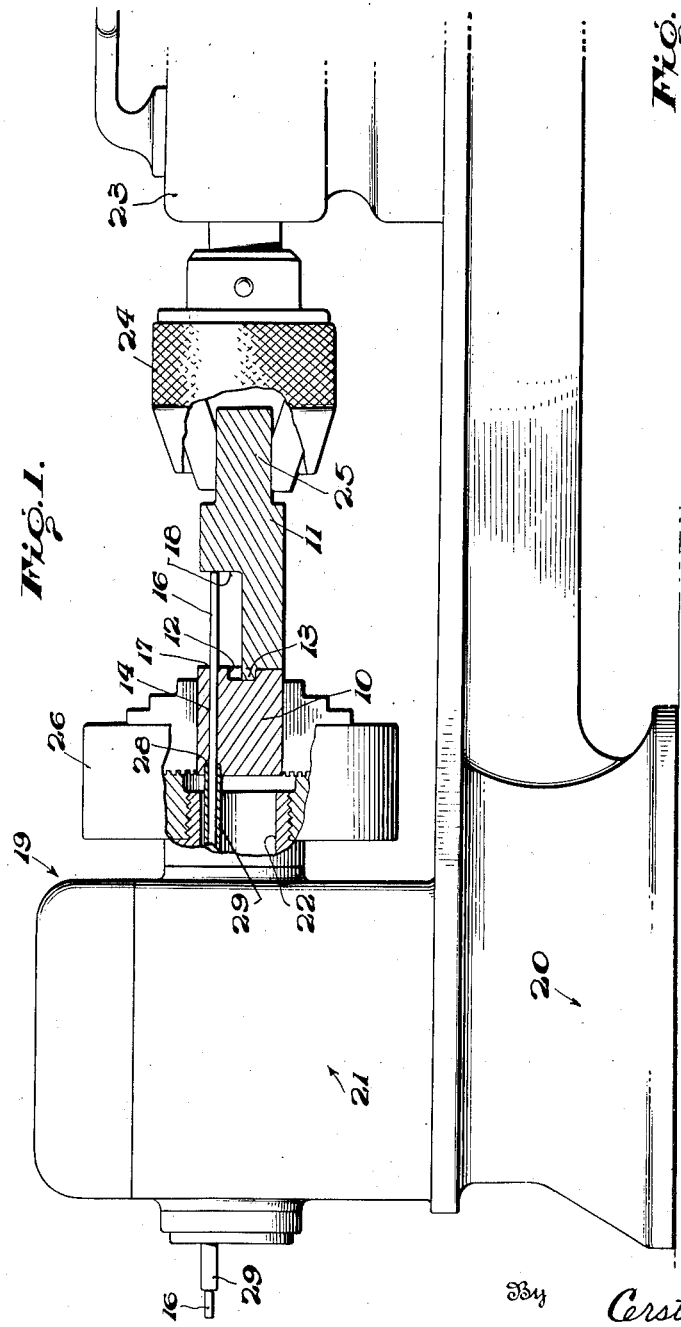
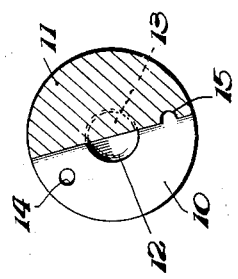
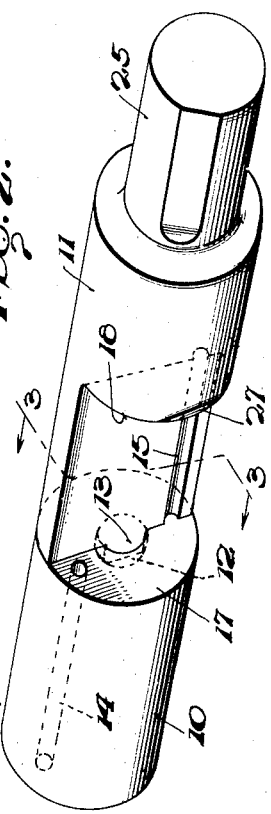
Inventor
*J. S. Hellen.*
By *Cerstvik + Kalman*
                                                    Attorneys Patented Oct. 20, 1942

2,299,578

UNITED STATES PATENT OFFICE 2,299,578

ROTARY PIN-CUTTING TOOL

James S. Hellen, Waldwick, N. J., assignor to Bendix Aviation Corporation, Bendix, N. J., a corporation of Delaware Application April 8, 1941, Serial No. 387,534

5 Claims. (Cl. 164—40)

This invention relates generally to machine elements or tools of the type adapted for use in cutting blanks or pins from rod stock.

Disadvantages ensuing from the use of tools, heretofore known in the art, for forming blanks or pins from rod stock have been that additional machining operations were usually required on the severed surfaces to insure clean and smooth ends or breaks for the blanks or pins. These additional operations necessarily consumed time and raised the cost of manufacture of the blanks or pins.

An object of the present invention, therefore, is to provide novel rotary cutting means for forming blanks or pins adapted to overcome the foregoing disadvantages.

Another object of the invention is to provide a novel rotary cutting tool which is self-sharpening for forming blanks or pins from rod stock.

A further object of the invention is to provide a novel cutting tool which does not require any special type of machine for its operation, but may be readily used with any lathe or similar machine.

Another object of the invention is to provide a novel cutting tool for forming blanks or pins from rod stock, which comprises a rotary member carrying the rod stock adapted to be chucked in a lathe for driving thereby, and a stationary cutting member adjacent the rotary member held in the tail stock of the lathe.

A still further object of the invention is to provide a novel rotary pin-cutting tool comprising a rotating part and a stationary part whereby blanks or pins are sheared off from the rod stock at each revolution of the rotating part.

Another object is to provide a novel rotary pin-cutting tool comprising a rotating part and a stationary part mounted in coaxial alignment with the rotating part and in frictional engagement therewith, whereby blanks or pins are cut from rod stock during relative movement of the rotating and stationary parts.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not designed as a definition of the limits of the invention, reference being had for this purpose to the appended claims.

In the drawing, wherein like reference characters refer to like parts throughout the several views, Figure 1 illustrates a longitudinal section of the novel cutting means of the present invention and its incorporation for use with a lathe;

Figure 2 is an enlarged perspective view of the novel cutting means of Figure 1; and, Figure 3 is a sectional view taken substantially along line 2—2 of Figure 2.

The present invention consists in providing a rotary cutting tool comprising a rotating member and a stationary member, the rotating member supporting the rod stock, and the stationary member defining an abutment for the stock, whereby the desired length of the blank or pin may be predetermined by forceable contact with the abutment, and having a grooved surface perpendicular to the abutment, whereby upon rotation of the rotating member the predetermined length of the rod stock is carried to and supported momentarily in the groove and subsequently sheared off clearly as the rotating member carries the stock past the groove.

The rotary pin-cutting tool of the present invention is formed of two substantially similar cylindrical members or cutters 10 and 11, as shown in Fig. 2 of the drawing, the former being provided with a circular recess 12 and the latter with a circular extension 13 for cooperation with the recess 12 of member 10, whereby the two cylindrical members 10 and 11 may be held together in coaxial alignment. A bore 14 is subsequently drilled in the member 10 which is eccentric with the central longitudinal axis of member 10 and extended into a portion of member 11 to form a bore or groove 15 therein likewise displaced eccentrically from the central longitudinal axis of member 11.

The desired length of the blanks or pins to be cut from the rod stock 16, better shown in Figure 1, is measured from the edge 17 of member 10 to a point on member 11, where a transverse cut is made into member 11 to a point coincident with the center of bore or groove 15. A second cut is made at a right angle to the first cut and along a plane parallel to and coincident with the center of the bore thus forming groove 15 and an abutment 18.

The diameter of bore 14 is substantially equal to the diameter of rod stock 16 and is adapted to have the stock rod fed therethrough manually or otherwise until the outer end of the stock contacts abutment 18 of member 11, whereupon the tool is ready for use to form blanks or pins of predetermined length from the stock 16.

In operation, as shown in Figure 1, the cutting tool may be readily used with a lathe, for example, such as that designated generally at 19 in the drawing. As shown, lathe 19 comprises a supporting base 20 carrying a power head 21 which drives a hollow spindle 22, and a tail stock 23 carrying a tail chuck 24.

The stationary member 11 is provided with a boss 25 by means of which the member is locked in place by tail stock chuck 24, while the rotating member 10 is mounted within a head stock chuck 26 which, in turn, is carried and driven by the hollow spindle 22. By adjustment of tail chuck 24 a slight pressure is exerted between the members 10 and 11, the extension 13 of member 11 cooperating with recess 12 of member 10 whereby the two members are held in coaxial alignment with one another with frictional engagement therebetween.

For the initial operation of the tool, members 10 and 11 are arranged in the relation shown in Figure 2 on the lathe 19. Rod stock 16 is fed through the hollow spindle 22 and bore 14 of member 10 to engage abutment 18 of member 11.

The rotary member or cutter 10 is driven in a counter-clockwise direction by spindle 22 so that it carries the predetermined length of rod stock 16 around until the latter reaches and momentarily rests within groove 15 of the stationary member or cutter 11. Continued relative movement between the edge of bore 14 and the groove 15 of cutters 10 and 11 results in a shearing or cutting off of a blank or pin from the remainder of the rod stock. In order to prevent binding of the finished blank or pin between the two cutters, a bevelled surface 27 may be provided for a portion of the abutment as shown in Figure 2, whereby the blank or pin is easily discharged therefrom.

As soon as the bore 14 of cutter 10 is free of the edge of cutter 11, the rod stock 16 is again passed through bore 14 until its edge again contacts abutment 18, whereupon the predetermined length of stock again travels angularly with cutter 10 until groove 15 is reached at which point, upon continued rotation of cutter 10, a blank or pin is again sheared off from the rod stock. The feeding operation is again repeated and a blank or pin is cut or sheared from the rod stock for each revolution of cutter 10.

It will be apparent that after each cutting operation, due to the pressure and frictional engagement between the two members and the relative rotation therebetween, the cutting edge of bore 14 as well as that of groove 15 will be self-sharpening, thus overcoming the necessity of disassembling and sharpening the tool at frequent intervals.

In order to overcome any whipping action on the part of the rod stock extending from lathe 19 during relatively rapid operation of the latter, member or cutter 10 may be provided with an enlarged bore 28 concentric with the bore 14 for receiving a hollow tube 29 therein whose free end extends through the hollow spindle 22 as better shown in Figure 1. However, the whipping action is negligible at relatively low speeds and the above tube may be dispensed with, if desired.

From the foregoing it will be apparent to those skilled in the art that a novel machine element or pin-cutting tool has been provided, which is capable of use with any lathe or similar machine and is self-sharpening after each cutting operation.

Although only one embodiment of the invention has been illustrated and described in detail, it is to be expressly understood that the invention is not limited thereto. For example, the rod stock may be fed automatically as well as manually into bore 14, and the stationary member or cutter could be provided with an adjustable abutment, whereby various sizes of blanks or pins may be cut from the rod stock without disassembling the tool from the lathe. Various other changes may also be made in the design and arrangement of the parts without departing from the spirit and scope of the invention, as the same will now be understood by those skilled in the art. For a definition of the limits of the invention reference will be had primarily to the appended claims.

What is claimed is:

1. A rotary pin-cutting tool for use in a lathe or the like comprising a stationary cylindrical member and a rotatable cylindrical member in frictional engagement with the stationary member, the central longitudinal axis of said stationary member being coaxial with the central longitudinal axis of said rotatable member, said rotatable member being adapted to be driven by suitable means and having a longitudinal bore formed therethrough parallel to and eccentric with the central longitudinal axis of said rotatable member for receiving and supporting rod stock therein, said stationary member having a cut-away portion thus defining an abutment so that a predetermined length of stock may be forced thereagainst from said rotating member, the stationary member further having a groove formed therein in coaxial alignment with said bore for receiving said predetermined length of stock, whereby a predetermined blank or pin is cut from the rod stock during relative rotation between said rotatable and stationary members.

2. A rotary pin-cutting tool for use in a lathe or the like comprising a stationary cylindrical member, a rotatable cylindrical member mounted in frictional engagement with said stationary member and for relative rotary movement with respect thereto, and means for driving said rotatable member, said rotatable member having a bore formed therethrough parallel to and eccentric with the central longitudinal axis of said rotatable member for receiving and supporting rod stock therein and having a central recess at one of its ends, said stationary member having a cut-away portion thus defining an abutment so that a predetermined length of stock may be fed from said rotatable member thereagainst, the stationary member having further a projection at one of its ends for association with the central recess of the rotatable member and a groove formed therein in coaxial alignment with said bore for receiving said predetermined length of stock whereby a blank or pin is cut from the rod stock during relative movement between said rotatable and stationary members, the edge of the groove adjacent the rotatable member constituting a shearing edge which is self-sharpening during relative movement between the stationary and rotatable members by virtue of the frictional engagement therebetween.

3. As a new article of manufacture, a cutting tool comprising a pair of coaxially aligned members mounted in frictional engagement at their inner edges and for relative rotation with respect to each other, one of said members having a central recess at its inner end and a longitudinal bore formed therethrough eccentric to its central longitudinal axis, and the other of said members having an extension at its inner end for cooperation with the central recess of said one member and a longitudinal groove formed therein in coaxial alignment with said bore.

4. A rotary pin-cutting tool for use in a lathe or the like comprising a stationary member, and a rotatable member mounted in frictional engagement with said stationary member for relative rotary movement with respect thereto and adapted to be driven by suitable means, said rotatable member having a bore formed therethrough parallel to and eccentric with the central longitudinal axis of said rotatable member for receiving and supporting rod stock therein and having a central recess at one of its ends, said stationary member having a cut-away portion thus defining an abutment so that a predetermined length of stock may be fed from said rotatable member thereagainst, the stationary member having further a projection at one of its ends for association with the central recess of the rotatable member and a groove formed therein in coaxial alignment with said bore for receiving said predetermined length of stock whereby a blank or pin is cut from the rod stock during relative movement between said rotatable and stationary members, the edge of the groove adjacent the rotatable member constituting a shearing edge which is self-sharpening during relative movement between the stationary and rotatable members by virtue of the frictional engagement therebetween.

5. A rotary pin-cutting tool for use in a lathe or the like comprising a stationary member, a rotatable member mounted in frictional engagement with said stationary member for relative rotary movement with respect thereto and being adapted to be driven by suitable means, said rotatable member having a bore formed therethrough parallel to and eccentric with the central longitudinal axis of said rotatable member for receiving and supporting rod stock therein and having a central recess at one of its ends, said stationary member having a limit-stop portion so that a predetermined length of stock may be fed from said rotatable member thereagainst, the stationary member having further a projection at one of its ends for association with the central recess of the rotatable member and a groove formed therein in coaxial alignment with said bore for receiving said predetermined length of stock whereby a blank or pin is cut from the rod stock during relative movement between said rotatable and stationary members, the edge of the groove adjacent the rotatable member constituting a shearing edge which is self-sharpening during relative movement between the stationary and rotatable members by virtue of the frictional engagement therebetween, and a beveled edge carried by said limit stop for aiding in blank or pin discharge subsequent to each cutting operation.

JAMES S. HELLEN.